United States Patent
Olson, Jr. et al.

(10) Patent No.: US 9,257,862 B2
(45) Date of Patent: Feb. 9, 2016

(54) METHOD AND APPARATUS FOR BATTERY DESULFATION

(71) Applicant: Best Environmental Solutions, LLC, Cullman, AL (US)

(72) Inventors: Robert D. Olson, Jr., Warrior, AL (US); Forrest Lee Johnson, Hayden, AL (US); Robert Elliott Morgan, Cullman, AL (US)

(73) Assignee: Best Environment Solutions, LLC, Cullman, AL (US)

( * ) Notice: Subject to any disclaimer, the term of this patent is extended or adjusted under 35 U.S.C. 154(b) by 334 days.

(21) Appl. No.: 13/771,978

(22) Filed: Feb. 20, 2013

(65) Prior Publication Data

US 2013/0214728 A1    Aug. 22, 2013

Related U.S. Application Data

(60) Provisional application No. 61/600,761, filed on Feb. 20, 2012.

(51) Int. Cl.
| | |
|---|---|
| *H02J 7/00* | (2006.01) |
| *H02J 7/14* | (2006.01) |
| *H01M 10/42* | (2006.01) |
| *H01M 10/06* | (2006.01) |

(52) U.S. Cl.
CPC ............ *H02J 7/007* (2013.01); *H01M 10/4242* (2013.01); *H02J 7/0057* (2013.01); *H02J 7/1476* (2013.01); *H01M 10/06* (2013.01)

(58) Field of Classification Search
CPC ........................................................ H02J 7/00
USPC ........................................................ 320/107
See application file for complete search history.

(56) References Cited

U.S. PATENT DOCUMENTS

| | | | | |
|---|---|---|---|---|
| 6,515,456 | B1* | 2/2003 | Mixon | H02J 7/1453 320/137 |
| 2006/0250114 | A1* | 11/2006 | Faberman | H02K 3/50 322/24 |
| 2008/0048623 | A1* | 2/2008 | Le Gall | H01M 10/44 320/145 |
| 2008/0211330 | A1* | 9/2008 | Scott | H02P 9/48 310/52 |
| 2009/0230802 | A1* | 9/2009 | Kamiya et al. | 310/156.53 |
| 2010/0025128 | A1* | 2/2010 | Abe | B60K 6/448 180/65.25 |
| 2010/0201320 | A1* | 8/2010 | Coe | H01M 10/44 320/129 |
| 2011/0273143 | A1* | 11/2011 | Aanensen | H02J 7/0075 320/139 |
| 2012/0186888 | A1* | 7/2012 | Ross | B60K 1/04 180/65.31 |
| 2013/0207592 | A1* | 8/2013 | Okada | B60L 3/0046 320/106 |
| 2013/0249295 | A1* | 9/2013 | Hsieh | H02J 7/35 307/43 |
| 2013/0249466 | A1* | 9/2013 | Hsieh | H02J 7/35 320/101 |

* cited by examiner

*Primary Examiner* — Mohammed Alam
(74) *Attorney, Agent, or Firm* — Erickson Kernell Derusseau & Kleypas, LLC

(57) ABSTRACT

A method and apparatus for removing the sulfation from the plates of the battery and driving the sulfate crystals back into the electrolyte solution without overheating the battery is presented. The present invention includes a rotary magnetic hub and coil assembly to produces a unique output not found in other charging systems on the market. The battery desulfation method and apparatus of the present invention is self-adjusting to the battery, regardless of voltage and works by removing the sulfate crystals from the plates of lead acid batteries. As a result, the normal life of the average battery may be greatly extended. Heavily sulfated batteries may be brought back to working condition. When used for short durations for healthy batteries, the present invention keeps the sulfate crystals off the plates and in solution to extend the working life of the battery.

12 Claims, 2 Drawing Sheets

METHOD AND APPARATUS FOR BATTERY DESULFATION

CROSS-REFERENCE TO RELATED APPLICATION

This application claims the benefit of application Ser. No. 61/600,761, filed on Feb. 20, 2012, entitled METHOD AND APPARATUS FOR BATTERY DESULFATION.

FIELD

The present invention relates to a method and apparatus for battery conditioning, and more particularly, to a method and apparatus to desulfation lead acid batteries.

BACKGROUND

Lead acid batteries are a fundamental staple of our modern electrical society, these batteries are found in almost every aspect of our daily lives whether we realize it or not. Lead acid batteries are used in transportation, heavy equipment, telecommunications, computer networking, backup power supplies, alternative energy solutions (a.k.a. solar, wind, and small hydro turbine solutions).

As the need to store and have electrical energy ready as demand increases, so does the importance of the battery. Lead acid batteries have been the workhorse of this need for more than a century. One of the problems that arises from the use of these batteries is the sulfation of the lead plates within the battery that limit and ultimately render useless the energy obtainable from them.

During use of the battery the sulfuric acid chemical solution electrolyte deposits sulfide crystals on the plates of the battery. As the crystals grow the battery's output declines sharply, as less and less surface area of the lead plate has the ability to interact with the electrolyte solution.

The conventional solution to this build up is to do what is called an equalization charge. This charge is really a controlled over charge of the battery. High amperage and a voltage capable of putting the battery into reverse or charge mode is applied to the battery. This high amperage charging leads to internal heating, which leads to less conduction, which in turn leads to more heating. If not carefully controlled, the battery can enter a thermal runaway effect that overheats the battery and causes excessive off gassing of the electrolyte solution. This situation usually irreversibly damages the battery.

Current charging systems basically fall into one of two categories: 1. Standard high amperage regulated voltage charger with trickle charge capacity; 2. Low amperage pulse charge systems with timed charging.

Standard high amperage and trickle chargers apply a regulated voltage of sufficient value to put the battery into charge mode and a moderate to high current level to charge the battery. This charge may remove a small amount of the sulfate crystal growth, but it still has the disadvantage of heating the battery, and cannot remove the crystal growth effectively enough to keep the battery from sulfating.

Pulse charging attempts to apply a low current voltage with a resonate frequency square wave to the battery in order to induce desulfation without overheating the battery. These charging systems tout the ability to keep a battery from heavy sulfation through the use of a low amperage continuous pulse charge. This system has the distinct disadvantage of having to constantly keep the battery on the charger in order to keep the sulfation process at bay.

SUMMARY

The method and apparatus of the present invention seeks out and removes the sulfation from the plates of the battery and drives it back into the electrolyte solution without overheating the battery. The present invention includes a rotary magnetic hub and coil assembly to produces a unique output not found in other charging systems on the market.

The battery desulfation method and apparatus of the present invention is self-adjusting to the battery, regardless of voltage (6V, 12V, 24V, 36V, 48V, etc.) and works by removing the sulfate crystals from the plates of lead acid batteries. As a result, the normal life of the average battery may be greatly extended. Heavily sulfated batteries may be brought back to working condition. When used for short durations for healthy batteries, the present invention keeps the sulfate crystals off the plates and in solution to extend the working life of the battery.

DETAILED DESCRIPTION

As required, detailed embodiments of the present invention are disclosed herein. However, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Moreover, except where otherwise expressly indicated, all numerical quantities in this description and in the claims are to be understood as modified by the word "about" in describing the broader scope of this invention. Practice within the numerical limits stated is generally preferred. Also, unless expressly stated to the contrary, the description of a group or class of materials as suitable or preferred for a given purpose in connection with the invention implies that mixtures or combinations of any two or more members of the group or class may be equally suitable or preferred.

Figure 1:
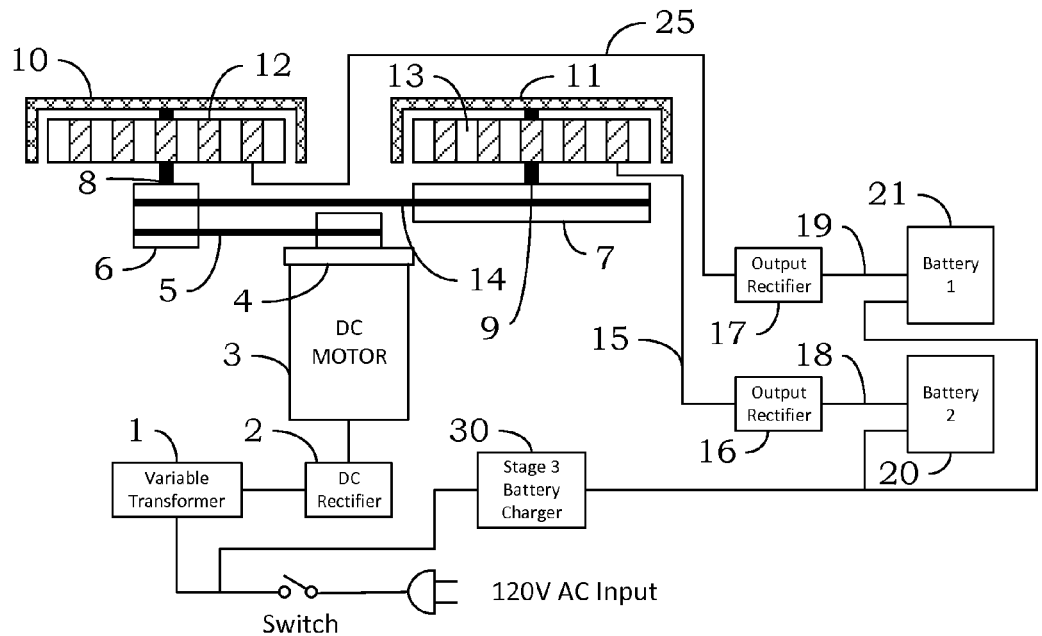
FIG. 1 is a functional block diagram of the apparatus of the present invention.

Referring to the FIG. 1, the desulfation apparatus of the present invention is generally indicated by reference numeral 100. The desulfation apparatus 100 includes an electric motor 3, a weighted flywheel 4, two drive belts 5 and 14, and two pulleys 6 and 7, two rotating magnetic hubs 10 and 11 with 48 magnetic poles each, one 30-pole stator 12 wound with copper wire around independent, magnetically-insulated ferrous cores, a one 36 pole coil assembly 13 wound with copper wire around independent, magnetically-insulated ferrous cores, a variable transformer 1, and three DC rectifier electrical circuits 2, 16 and 17.

The AC variable transformer 1 receives input power from a standard wall outlet of 115-120V AC at 20 Amperes power through a switch and varies the power input from zero to 160V AC with up to 20 amps output.

The variable transformer 1 output is rectified through a rectifier circuit 2 into a DC voltage output and coupled to a 3HP 170V DC motor 3, for example. The rotor of the DC motor 3 is coupled to the weighted flywheel pulley 4 that is coupled to the shaft 8 of a first rotor 10 by means of a belt drive 5 and pulley 6.

Pulley 6 is a double pulley with one pulley receiving belt 5 from the motor's weighted flywheel 4 and the other pulley receiving belt 14 to transfer mechanical rotation to a shaft 9 of a second rotor 11. Shaft 9 is coupled to a 4:1 pulley 7 for receiving mechanical rotation from shaft 8 via belt 14. Thus, the second rotor 11 has a 4-times greater torque ratio than the first rotor 10.

The variable transformer 1 may be used to control the speed of rotation of the first rotor 10 and second rotor 11 for the purpose of generating electricity from a first stator 12 and second stator 13. The electricity produced by the rotating of the first rotor 10 magnetic hub and the second rotor 11 magnetic hub and the first stator coil assembly 12 and the second stator coil assembly 13 is sent through wiring harness 25 and wiring harness 15 to rectifier circuit 17 and rectifier circuit 16 and then to battery 21 and battery 20.

The first stator coil assembly 12 includes a group of 30 coils. These coils generate electricity by the rotation of first rotor magnetic hub 10. The magnetic rotor hub 10 includes 48 magnets. The second stator coil assembly 13 is wired into five phases, each with six coils in a star configuration. These coils are electrically connected but are not magnetically connected with a ferrous metal like most generators. The magnetic flux does not have a centralized magnetic connection for the purpose of flux containment.

The output of rotor 10 and stator coil 12 through rectifier circuit 17 is coupled to battery 21 to put the battery in charge mode. The output power of the stator coil 12 is fixed, however the voltage output is configured to allow it to float up and down from 0 to 600 volts, for example, to match the battery voltage in order to go into reverse mode and charge the battery. As a result, a heavily sulfated battery usually requires a higher voltage than normal to begin the desulfation process and a lower current, which may range from 0 to 4 amps, for example.

After a period of time, typically 10 to 20 minutes, for example, the battery 21 is disconnected from stator coil 12 and connected to stator coil 13. Stator coil 13 is a 36 coil assembly and rotor 11 has a 48 pole magnetic hub. As with stator coil 12, more magnetic poles exist than stator coil poles. However, unlike stator coil 12, stator coil 13 is arranged into 6 parallel groups of 3 phase 2 pole assemblies. This arrangement provides a second stage in the desulfation process.

After the sulfate has been forcibly removed from the lead plates, the battery will be able to accept and retain much more current when under charge. The stator coil 13 provides a much larger amount of current to the battery 21 to charge the battery, up to 18 amps, for example.

Figure 3:
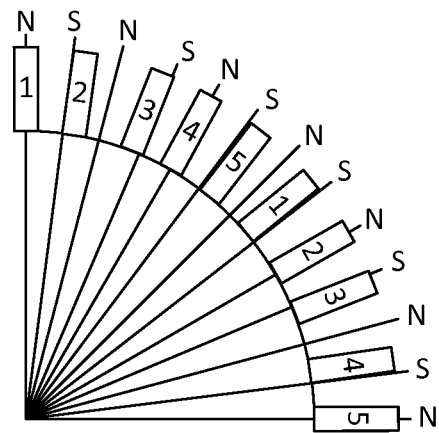
FIG. 3 is an illustration of the nonlinear magnetic arrangement of coils with the magnetic poles of the rotating magnetic hub.
Figure 4:
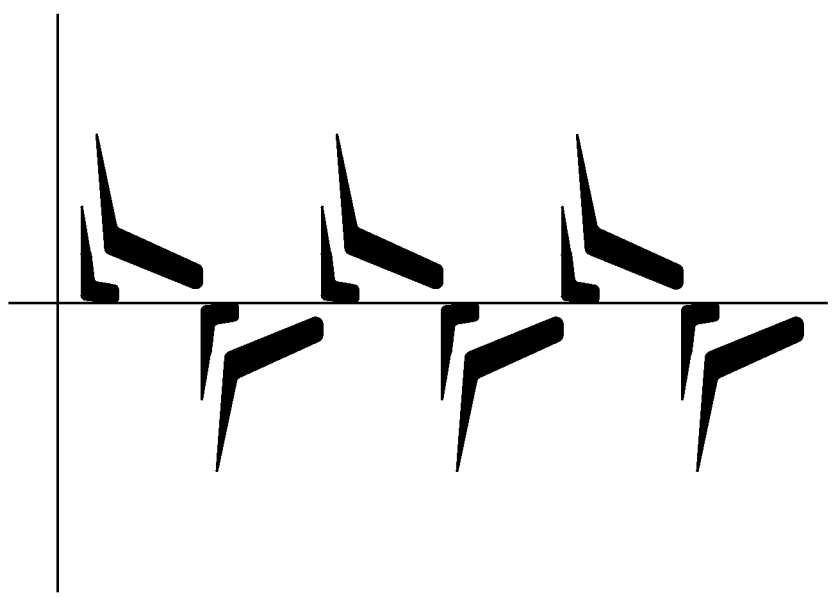
FIG. 4 is a double magnetic impulse output waveform from rectifier circuits.

This setup creates a nonlinear arrangement where three of the six coils in each phase are slightly misaligned with the magnetic poles of the rotating first magnetic hub 10 (FIG. 3). The result is a double magnetic impulse wave that travels longitudinally with the AC voltage wave (FIG. 4). This AC voltage is rectified 30 and sent to battery 21. The double impulse longitudinal magnetic wave continues to battery 21 along with the DC voltage from the stator coil assembly 13.

While the AC voltage produced is rectified to DC voltage through the rectifier circuit 17 the magnetic wave continues at a rate of approximately 1.43 kHz, with a setting of 110V AC output from the variable transformer 1. The higher the output voltage from the variable transformer 1, the higher the rotation speed of the DC motor 3, and thus the higher the magnetic wave output frequency generated.

This frequency was measured at the battery terminals themselves. Although an oscilloscope will show only a DC voltage signal with some associated noise, frequency counters reveal the super imposed magnetic wave component frequency. It is the combination of this DC voltage potential and the underlying super imposed magnetic wave that accomplishes the desulfation work inside the battery as described.

As the speed of the rotation determines the power output, and is fixed due to the magnetic flux of the rotor and stator coil assemblies, it is common for open load voltage to be 200 to 600 volts or more in stage 1 when no current flow is present. When presented with a load (battery), the voltage drops to accommodate the internal resistance of the load (battery) and the current increases from 0 to 18 amps for example, based on the voltage. The internal resistance (impedance) of the load determines the current output. In this manner, the output changes as the battery resistance changes (lowers). Because the current is minimal during the reconditioning process, the battery chemistry does not heat excessively. As the reconditioning process continues, the resistance (impedance) continues to lower, reducing the electromotive action of the voltage potential and increasing the current absorption rate of the battery. A higher than normal resistance in the battery reduces the current flow and increases the voltage applied to the battery.

A sulfated battery plate represents a higher than normal resistance value inside a lead acid battery. As the sulfate crystals accumulate on the lead plates less and less surface area is exposed to the electrolyte. This action limits the ability of the battery's chemistry to produce electrical power and current flow.

Figure 2:
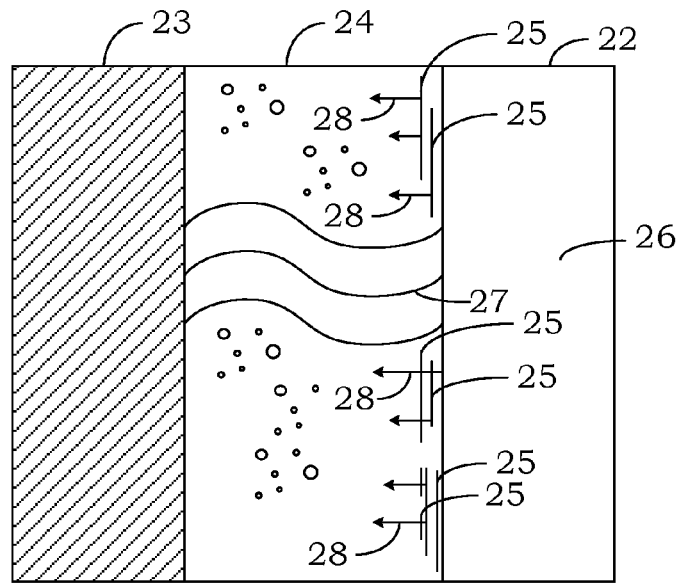
FIG. 2 is an illustration of the desulfation process of the present invention.

Referring to FIG. 2, a cross-section of a lead acid battery 21 is illustrated. Sulfate crystals 25 form on the lead plates 22 and 23 inside the battery 21. This action tends to create additional electrical resistance in a typical lead acid battery. The output of the first rotor 10 and first stator coil assembly 12 through rectifier circuit 17 comes into battery 21 through its post terminals to put the battery into charge mode.

The output from the first stator assembly 12 has a fixed amount of power it can provide, however, the voltage output is configured in such a way as to allow it to float up and down to match what the battery needs to go into reverse mode and charge.

As a result, heavily sulfated batteries will begin the process with a higher voltage than normal, but less current. The voltage, when applied to the lead plates 22 and 23, will cause negative ions 26 to accumulate behind the sulfate crystals 25 creating an outward electromotive force 28 as the electrons seek out weak areas in the sulfate crystals 25 in order to follow the magnetic wave 27 through the electrolyte 24. As the sulfate crystals 25 breakaway from the lead plate 22, the overall battery resistance drops, resulting in a drop of the applied voltage and a rise in the applied current flow. This process continues until normal operating levels are achieved.

After a period of time, typically 10 to 20 minutes, the battery is moved or automatically switched from the first stator coil assembly 12 to receive power from the second stator coil assembly 13. The switching may be accomplished with a timer or with a switching relay based on the voltage or current applied to the battery. The second stator coil assembly 13 is a 36-coil assembly with the second rotor 11 being a 48 pole magnet hub. As with the first stator assembly 12 more magnetic poles exist than stator coil poles. However, unlike the first stator assembly 12 with 5 phases consisting of three offset magnetic poles and three phase oriented poles for a total of 30 stator poles, the second stator assembly 13 is wired into six parallel groups of three-phase 2 pole assemblies. This arrangement is designed to act as a second stage in the process.

After the sulfate has been forcefully removed from the lead plates 22, the battery will be able to accept and retain much more current when under charge. The second stator coil assembly 13 provides a much larger amount of amperage to the battery for that purpose.

It is to be understood that while certain now preferred forms of this invention have been illustrated and described, it is not limited thereto except insofar as such limitations are included in the following claims.

Having thus described the invention, what is claimed as new and desired to be secured by Letters Patent is as follows:

1. A method of desulfation of a battery comprising:
    rotating a first rotor having a first plurality of magnets about a first stator having a first plurality of coils to produce a first electrical DC output,
    applying said first electrical output to a battery for a period of time,
    rotating a second rotor having a second plurality of magnets about a second stator having a second plurality of coils to produce a second electrical DC output,
    applying said second electrical output to said battery after expiration of said period of time, and
    applying a third electrical AC output to said battery with said second electrical output,
    wherein said first electrical DC output has a fixed power variable voltage,
    wherein said second electrical DC output has a fixed power, a variable current and a magnetic impulse wave, and
    wherein said magnetic impulse wave is a double magnetic impulse wave, and
    wherein said magnetic impulse wave has a frequency proportional to the rotational speed of said second rotor, and
    wherein said third electrical AC output is coupled to said second electrical DC output as a carrier for the magnetic impulse wave.

2. The method of claim 1 wherein said variable voltage of said first electrical DC output is proportional to an internal resistance of said battery.

3. The method of claim 1 wherein said variable current of said second electrical DC output is proportional to an internal resistance of said battery.

4. The method of claim 1 wherein said first rotor includes 48 magnets and said first stator includes a group of 30 coils.

5. The method of claim 1 wherein said second rotor includes 48 magnets and said second stator includes 30 coils arranged into five phases of six coils each.

6. The method of claim 5 wherein said coils of said second stator are electrically coupled but not magnetically coupled together.

7. An apparatus for battery desulfation:
    a motor coupled to a power source,
    a first rotor having a first plurality of magnets coupled to said motor and rotating about a first stator having a first plurality of coils to produce a first DC output,
    a battery coupled to said first DC output for a first period of time,
    a second rotor having a second plurality of magnets coupled to said motor and rotating about a second stator having a second plurality of coils to produce a second DC output,
    said battery coupled to said second DC output after expiration of said period of time, and
    a third AC output coupled to said battery with said second electrical output,
    wherein said first DC output has a fixed power and variable voltage,
    wherein said second electrical DC output has a fixed power, a variable current and a magnetic impulse wave, and
    wherein said magnetic impulse wave is a double magnetic impulse wave, and
    wherein said magnetic impulse wave has a frequency proportional to the rotational speed of said second rotor, and
    wherein said third electrical AC output is coupled to said second DC output as a carrier for said magnetic impulse wave.

8. The apparatus of claim 7 wherein said variable voltage of said first DC output is proportional to an internal resistance of said battery.

9. The apparatus of claim 7 wherein said variable current of said second DC output is proportional to an internal resistance of said battery.

10. The apparatus of claim 7 wherein said first rotor includes 48 magnets and said first stator includes a group of 30 coils.

11. The apparatus of claim 7 wherein said second rotor includes 48 magnets and said second stator includes 30 coils arranged into five phases of six coils each.

12. The apparatus of claim 11 wherein said coils of said second stator are electrically coupled but not magnetically coupled together.

* * * * *